(12) United States Patent
Hetrick

(10) Patent No.: US 12,032,198 B2
(45) Date of Patent: Jul. 9, 2024

(54) TENSIONER FOR OPTICAL FILMS

(71) Applicant: SIGNIFY HOLDING B.V., Eindhoven (NL)

(72) Inventor: Westly David Hetrick, Atlanta, GA (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/024,537

(22) PCT Filed: Sep. 10, 2021

(86) PCT No.: PCT/EP2021/074965
§ 371 (c)(1),
(2) Date: Mar. 3, 2023

(87) PCT Pub. No.: WO2022/063609
PCT Pub. Date: Mar. 31, 2022

(65) Prior Publication Data
US 2023/0314694 A1 Oct. 5, 2023

Related U.S. Application Data

(60) Provisional application No. 63/081,401, filed on Sep. 22, 2020.

(30) Foreign Application Priority Data

Sep. 24, 2020 (EP) .................................. 20197982

(51) Int. Cl.
*F21V 8/00* (2006.01)
*F21V 11/16* (2006.01)

(52) U.S. Cl.
CPC ............ *G02B 6/0088* (2013.01); *F21V 11/16* (2013.01); *G02B 6/005* (2013.01)

(58) Field of Classification Search
CPC ................................ G02B 6/005; F21V 11/16
See application file for complete search history.

(56) References Cited

U.S. PATENT DOCUMENTS

2006/0171164 A1    8/2006   Kida
2009/0201441 A1*   8/2009   Laney ............... G02F 1/133606
                                                                349/64

(Continued)

FOREIGN PATENT DOCUMENTS

CN    101158772 A    4/2008
CN    205229631 U    5/2016

(Continued)

*Primary Examiner* — Karabi Guharay

(57) ABSTRACT

A light emitting device (1) comprising an optical film (2) and a tensioner (3), the tensioner (3) being configured to accommodate a change in shape and/or position of the optical film (2), and the tensioner (3) comprising at least one resilient element (8) and a housing frame (4) configured to be connected to a backplate (5) of the light emitting device (1), the housing frame (4) including at least one mounting opening (7) configured to accommodate the at least one resilient element (8), the at least one resilient element (8) being provided between the housing frame and the optical film, the at least one resilient element (8) being placed in the at least one mounting opening (7), the at least one resilient element (8) being adapted for being in contact with the optical film (2), and the at least one resilient element (8) being arranged inclined with respect to a plane (P) in which the optical film (2) extends.

12 Claims, 3 Drawing Sheets

(56) References Cited

U.S. PATENT DOCUMENTS

| | | |
|---|---|---|
| 2012/0147622 A1 | 6/2012 | Tsai et al. |
| 2014/0218963 A1 | 8/2014 | Tang |
| 2017/0343721 A1 | 11/2017 | Takada et al. |

FOREIGN PATENT DOCUMENTS

| | | |
|---|---|---|
| EP | 2090922 A1 | 8/2009 |
| JP | 2007114590 A | 5/2007 |
| JP | 2020012960 A | 1/2020 |
| WO | 2012141084 A1 | 10/2012 |

* cited by examiner

TENSIONER FOR OPTICAL FILMS

CROSS-REFERENCE TO PRIOR APPLICATIONS

This application is the U.S. National Phase application under 35 U.S.C. § 371 of International Application No. PCT/EP2021/074965, filed on Sep. 10, 2021, which claims the benefits of European Patent Application No. 20197982.0, filed on Sep. 24, 2020, and U.S. Patent Application No. 63/081,401, filed on Sep. 22, 2020. These applications are hereby incorporated by reference herein.

FIELD OF THE INVENTION

The invention relates to a light emitting device comprising an optical film and a tensioner, where the tensioner is configured to accommodate a change in shape and/or position of the optical film, and wherein the tensioner comprises a housing frame configured to be connected to a backplate of the light emitting device.

BACKGROUND OF THE INVENTION

A current trend in light is the use of optical films with a light source for light output control, and/or for decorative effect. When in use the optical film is subjected to mechanical stress and temperature change. Those factors often cause an unwanted shape and/or position change of the optical film. Therefore, the optical film can exhibit wrinkles and/or displacement that would reduce the optical proprieties and quality of the optical film itself, exposing the whole light emitting device to a faster quality degradation process leading to a premature failure of the device itself. Additionally, the shape change can occur locally in a specific point of the optical film requiring a specific solution to this issue.

As such optical film wrinkles is a known issue, some solutions have been provided in the state of art. For example, document CN 205229631 U describes an LCD display in which the optical film is fixed with a roller to keep the optical firm from wrinkling during operation. This solution improves surface smoothness. However, this solution does not allow for adjusting the direction of tension or to remove local shape change. Furthermore, this solution is relatively bulky.

CN101158772 discloses a down-backlight module and an optical film fixed structure comprises at least one of the optical films, two non-neighboring edges of the optical film group are provided with at least one through hole, each through hole is symmetrically or asymmetrically arranged with the through hole of one non-neighboring edge, a plurality of flexible bodies are respectively arranged in each through hole and respectively provide an outward tension so as to maintain the optical film group flat, so the warpage distortion is not produced due to the changing of the environment temperature and humidity, the display quality and the optical taste of the plane display is effectively improved.

EP 2090922 discloses an invention that provides an optical element comprising at least one optical film wherein at least a portion of the optical film is maintained dimensionally stable by the presence of a mechanism for application of a controlled tensile force to the film. The mechanism for application of a controlled tensile force uses a crimping frame in association with a cantilevered spring which effectively maintains flatness of the film or films. The film preferably comprises a diffuser film which can be combined with other optical films There is thus still a desire to provide a light emitting device with which such wrinkling of the optical film is reduced considerably or avoided altogether.

SUMMARY OF THE INVENTION

With this background, it is therefore an object of the invention to provide a light emitting device with which wrinkling of the optical film is reduced considerably or avoided altogether such that the optical film may be maintained as planar as possible in working condition, even when the optical film is under tension. It is important that the optical film is as planar as possible to enable achieving the best optical performance and durability of the light emitting device.

A further object of the invention is to provide such a solution which is also simple and compact in structure, and which may optimize the performance and durability of the light emitting device.

According to a first aspect of the invention, this and other objects are achieved with a light emitting device comprising an optical film and a tensioner, the tensioner being configured to accommodate a change in shape and/or position of the optical film, and the tensioner comprising at least one resilient element and a housing frame configured to be connected to a backplate of the light emitting device through a fastening element, the housing frame including at least one mounting opening configured to accommodate the at least one resilient element, the at least one resilient element being provided between the housing frame and the optical film, where the at least one resilient element is placed in the at least one mounting opening, where the at least one resilient element is adapted to be in contact with the optical film, and where the at least one resilient element is arranged inclined with respect to a plane in which the optical film extends.

Thereby, and in particular by providing at least one resilient element placed between the housing frame and the optical film, where the at least one resilient element is placed in the at least one mounting opening, where the at least one resilient element is in contact with the optical film, and where the at least one resilient element is arranged inclined with respect to a plane in which the optical film extends, a light emitting device is provided with which wrinkling of the optical film is reduced considerably or avoided altogether such that it is ensured that the optical film is kept as planar as possible in working condition even when under considerable tension. Thereby it becomes possible to achieve an optimized optical performance and durability of the light emitting device.

Furthermore, a light emitting device is thereby provided which is simple and compact in structure, and which has an improved performance and durability.

In an embodiment, the inclination of the at least one resilient element with respect to the plane in which the optical film extends is 45 degrees or greater.

An inclination of the resilient element in respect to the plane of the optical film has the advantage of allowing for the resilient element to flexibly adapt and/or adjust to the different expansion and restriction conditions and position variations of the optical film.

In an embodiment, the at least one mounting opening comprises at least one side wall being inclined with respect to a plane in which the optical film extends.

Thereby, a light emitting device with which an inclined arrangement of the resilient element is obtained in a particularly simple manner and with a particularly simple structure is provided for.

In an embodiment, the at least one mounting opening comprises an upper surface adapted for abutment with the resilient element.

Thereby, a light emitting device with which a particularly simple manner of avoiding over-flexing of the resilient element is provided for.

In an embodiment, the at least one resilient element has a cylindrical shape, a parallelepipedal shape, or any shape being a combination of cylindrical and parallelepipedal.

Thereby a light emitting device is provided having a resilient element of a particularly simple structure, and thereby also a mounting opening of a particularly simple structure.

In an embodiment, the at least one resilient element is made of any one of a compressible material, a resilient material and a silicone. The resilient element may also be made of organic materials, polymers, metals or composites.

Silicones are a particularly preferred choice because they exhibit many useful characteristics to the scope of the invention, including low thermal conductivity, low chemical reactivity, low toxicity, thermal stability (constancy of properties over a wide temperature range of ~100 to 250° C.). Furthermore, silicones have the ability to repel water and form watertight seals, they do not stick to many substrates, but adheres very well to others, e.g. glass, and they do not support microbiological growth. Also, silicones are resistant to oxygen, ozone, and ultraviolet (UV) light and can be formulated to be electrically insulative or conductive. Silicones are also preferred because they are resistant to creep (sometimes also called cold flow) which is the tendency of a solid material to move slowly or deform permanently under the influence of persistent mechanical stresses. Such permanent deformation reduces the ability of the resilient element to adapt to the optical film.

In an embodiment, the at least one mounting opening is configured to accommodate the at least one resilient element in a manner conforming to the inclination and shape of the at least one resilient element.

Thereby, a light emitting device with a particularly simple and durable structure, and in particular connection of resilient element and mounting opening, is provided for.

In an embodiment, the frame housing includes a plurality of mounting openings and the light emitting device comprises a plurality of resilient elements distributed between the optical film and the frame housing and/or at one or more edges of the optical film.

For a distributed and uniform effect, the plurality of resilient elements is in an embodiment equally distributed around the edges of the optical film. Evenly distributed resilient elements can also accommodate and compensate local optical film deformation.

Thereby, a light emitting device is provided with which the optical film is kept particularly planar in working condition even when under considerable tension. Thereby it becomes possible to achieve an even further optimized optical performance and durability of the light emitting device.

In an embodiment, the resilient element is a circumferential or partially circumferential resilient element.

Particularly, in case of a fully circumferential element, i.e. a resilient element extending along the full circumference of the optical film, tensions of the optical film in all directions may be absorbed by the resilient element. Thereby, a light emitting device is provided with which the optical film is kept particularly planar in working condition even when under considerable tension. Thereby it becomes possible to achieve an even further optimized optical performance and durability of the light emitting device.

In an embodiment, the at least one resilient element is adhered to the at least one mounting opening. Alternatively, at least one resilient element is attached to the at least one mounting opening by means of friction.

Thereby, a particularly simple and durable connection of resilient element and mounting opening is provided for.

In an embodiment, the at least one resilient element is deformable from a rest position to a stress position, the rest position occurring when there is no tension applied to the at least one resilient element, and the stress position occurring when such an amount of tension is applied to the at least one resilient element that the resilient element is caused to flex into contact with an upper surface of the mounting opening.

Thereby a light emitting device with a particularly well-functioning resilient element is provided for, resulting in that the optical film is kept completely planar during operation.

In an embodiment, the at least one resilient element comprises a first portion which is configured to be in engagement with the at least one mounting opening, a second portion which is configured to be connected to or abutting the optical film, and a third portion, which is provided between the first portion and the second portion, and the mounting opening comprises an upper surface, at least a part of the upper surface being adapted for abutting the third portion of the resilient element.

Thereby the abutment between the third surface of the resilient element and the upper surface of the mounting opening may act to prevent the resilient element from flexing out of the mounting opening, i.e. prevent the first portion of the resilient element from coming out of engagement with the mounting opening.

In an embodiment, the frame housing includes a plurality of mounting openings, the light emitting device includes a plurality of resilient elements, each resilient element is connected to the housing frame at one of the mounting openings.

In an embodiment, a printed circuit board (PCB) or substrate with at least one LED light source is placed between the back plate and the housing frame.

In an embodiment, the optical film is a light source, and a reflector is placed in between the optical film and the backplate. The light source may for example be a LED, a diode laser, an OLED or an electroluminescent light source.

Such embodiments allow for different kind of shapes and geometries for the light source. The light source can be planar and therefore be the optical film itself, the most common kind of planar light sources are OLED and electroluminescent devices.

In an embodiment, the optical film is an optical element and is in contact with a light guide, where the light guide is arranged in an edge-lit configuration with a light source placed on an edge of the light guide, where the light guide is positioned in between the optical film and the backplate, and where a reflector is placed in between the backplate and the light guide.

An edge-lit configuration is to be understood as a light guide configuration where the light source is placed along the edges of the terminal part or end of the light guide. This provides for a particularly efficient incoupling of light into the light guide.

In an embodiment, a compressible material is placed in between the backplate and the reflector.

The wording "compressible material" as used herein is intended to encompass any material that is compressible, for instance a material of the same nature of the resilient element with or without similar mechanical characteristics.

The invention further relates to a luminaire with a light emitting device according to the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
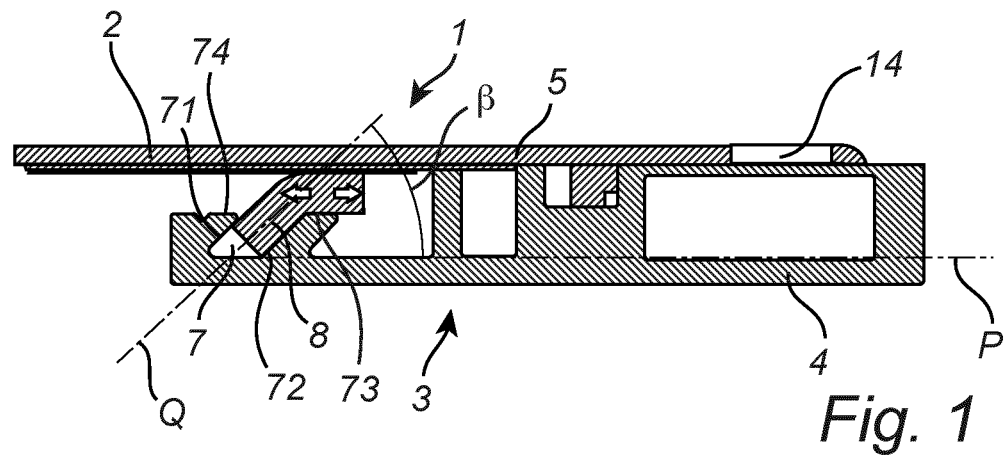
FIG. 1 shows a cross sectional view of a light emitting device according to a first embodiment of the invention and comprising a resilient element.

FIG. 1 shows a cross sectional view of a light emitting device 1 according to a first embodiment of the invention. The light emitting device 1 generally and in all embodiments comprises an optical film 2 and a tensioner 3. The tensioner 3 is generally configured to accommodate a change in shape and/or position of the optical film 2. The tensioner 3 generally and in all embodiments comprises a housing frame 4 and a resilient element 8. The tensioner 3 is configured to keep the optical film 2 in tension with the goal of maintaining a planar optical film 2.

Figure 4:
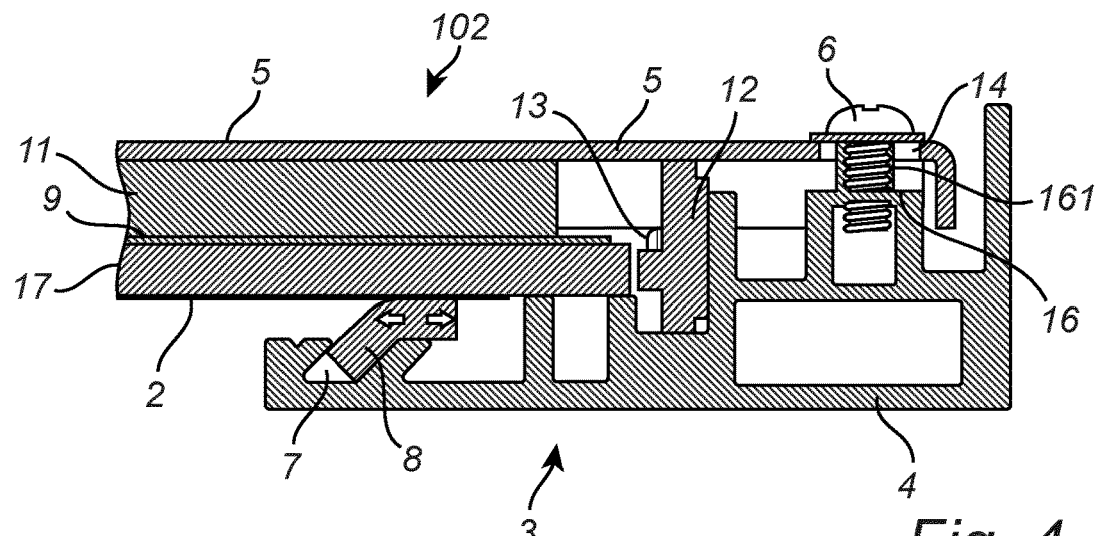
FIG. 4 shows a cross sectional view of a light emitting device according to a fourth embodiment of the invention and comprising a resilient element.

The housing frame 4 is adapted for connection to a backplate 5 of the light emitting device 1. The housing frame 4 may be connected to the back plate 5 by means of a fastening element 6 (FIG. 4), such as a screw or a bolt, inserted through an opening 14 in the back plate 5 and into an opening 16 (FIG. 4) of the housing frame 4. The opening 16 of the housing frame 4 may comprise a thread 161 (FIG. 4).

The housing frame 4 further comprises a mounting opening 7. The mounting opening is adapted for accommodating the resilient element 8 such that the resilient element 8 is placed between the housing frame 4 and the optical film 2. The housing frame 4 may comprise one mounting opening 7, which in some embodiments may be a circumferential mounting opening 7. Alternatively, the housing frame 4 may comprise a plurality of mounting openings The resilient element 8 is placed in the mounting opening 7 such that the resilient element 8 is in contact with the optical film 2. The resilient element 8 is arranged inclined with respect to a plane P in which the optical film 2 extends. The plane P is an imaginary plane in which the optical film 2 extends when the optical film 2 is fully plane. The resilient element 8 comprises a longitudinal plane Q, which extends in an angle β with the plane P in which the optical film 2 extends. The inclination, or angle β, may be 45 degrees or greater, or alternatively be in the interval of 45 to 85 degrees. The resilient element 8 may comprise a cylindrical shape, a parallelepipedal shape, or any shape being a combination of cylindrical and parallelepipedal. The resilient element 8 may be attached to the mounting opening 7 by means of an adhesive or by means of friction or another suitable fastening means or element.

The mounting opening 7 is configured to accommodate the resilient element 8 in such a way that the above inclination of the resilient element 8 is obtained and maintained. This may be obtained by providing the side walls 71, 72 of the mounting opening 7 with an inclination corresponding to the inclination of the resilient element 8 desired. The side walls 71, 72 of the mounting opening 7 may for instance be arranged inclined with respect to a plane P in which the optical film 2 extends, or in an angle β with respect to a plane P in which the optical film 2 extends. The inclination, or angle β, may be 45 degrees or greater, or alternatively be in the interval of 45 to 85 degrees.

The optical film 2 may be a light output control film, or a light source or a film with a decorative effect.

Figure 2:
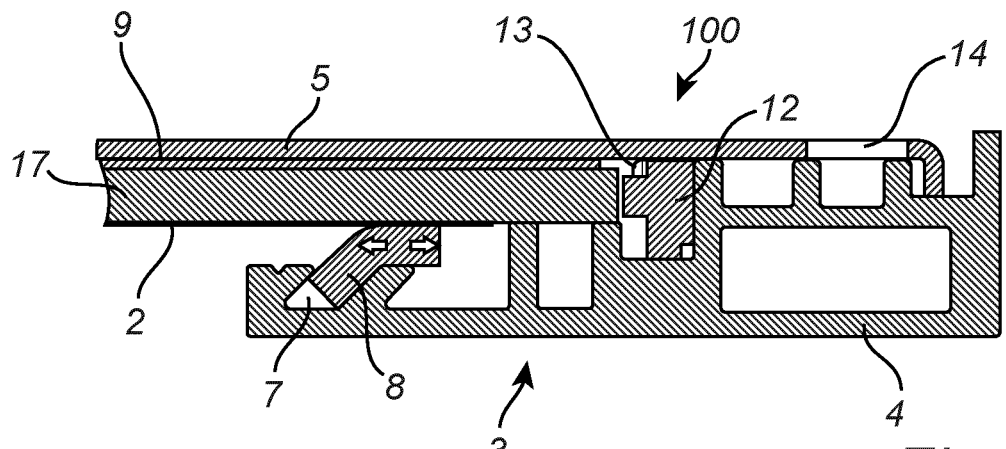
FIG. 2 shows a cross sectional view of a light emitting device according to a second embodiment of the invention and comprising a resilient element.

FIG. 2 shows a cross sectional view of a light emitting device 100 according to a second embodiment of the invention. The light emitting device 100 differs from the light emitting device of FIG. 1 described above only in virtue of the following features.

The light emitting device 100 comprises a light guide 17 arranged between the optical film 2 and the back plate 5. The light emitting device 100 also comprises a reflector or reflecting element 9 arranged between the optical film 2 and the back plate 5. The light emitting device 100 also comprises an LED 13 arranged on a substrate 12, such as a printed circuit board (PCB). The LED 13 is positioned in such a way with respect to the light guide 17, that light emitted from the LED 13 is coupled into the light guide 17, e.g. through an edge of the light guide 17.

Figure 3:
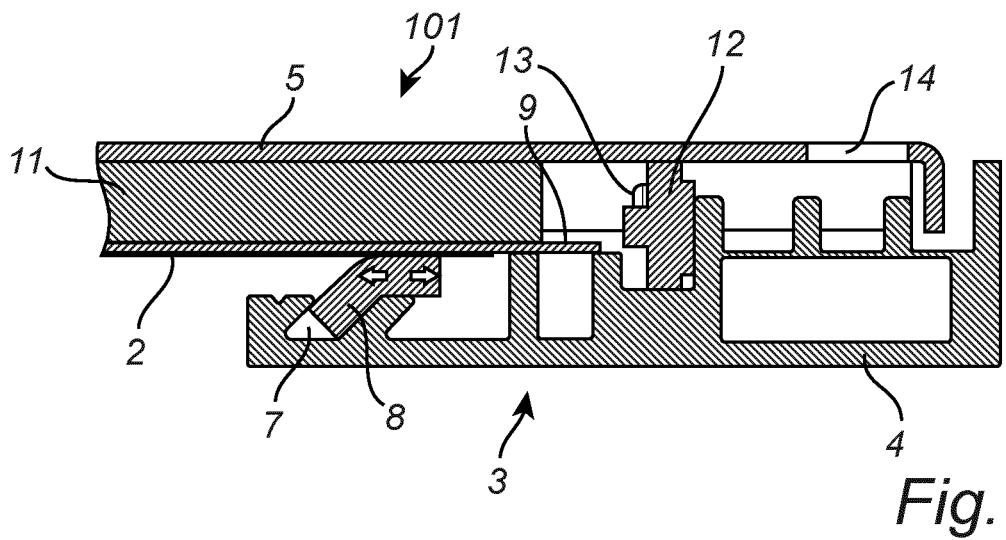
FIG. 3 shows a cross sectional view of a light emitting device according to a third embodiment of the invention and comprising a resilient element.

FIG. 3 shows a cross sectional view of a light emitting device 101 according to a third embodiment of the invention. The light emitting device 101 differs from the light emitting devices of FIGS. 1 and 2 described above only in virtue of the following features.

The light emitting device 101 comprises a compressible element 11, such as e.g. a foam element, arranged between the optical film 2 and the back plate 5. The light emitting device 101 also comprises a reflector or reflecting element 9 arranged between the optical film 2 and the compressible element 11. The compressible element 11 may be a foam or another suitable compressible material.

FIG. 4 shows a cross sectional view of a light emitting device 102 according to a fourth embodiment of the invention. The light emitting device 102 differs from the light emitting devices of FIGS. 1 to 3 described above only in virtue of the following features.

The light emitting device 102 comprises the following structure. A light guide 17 is arranged adjacent to the optical film 2. A reflector or reflecting element 9 is arranged on the light guide 17 opposite to the optical film 2. A compressible element 11, such as e.g. a foam element, is arranged between the reflecting element 9 and the back plate 5.

As an alternative to a light guide 17, the light emitting device according to the invention may also comprise a backlit light fixture and a rigid translucent sheet.

Furthermore, FIG. 4 shows the fastening element 6 used for attaching the housing frame 4 to the back plate 5 as well as the optionally threaded opening 16 in the housing frame 4 for receiving the fastening element 6.

Figure 5A:
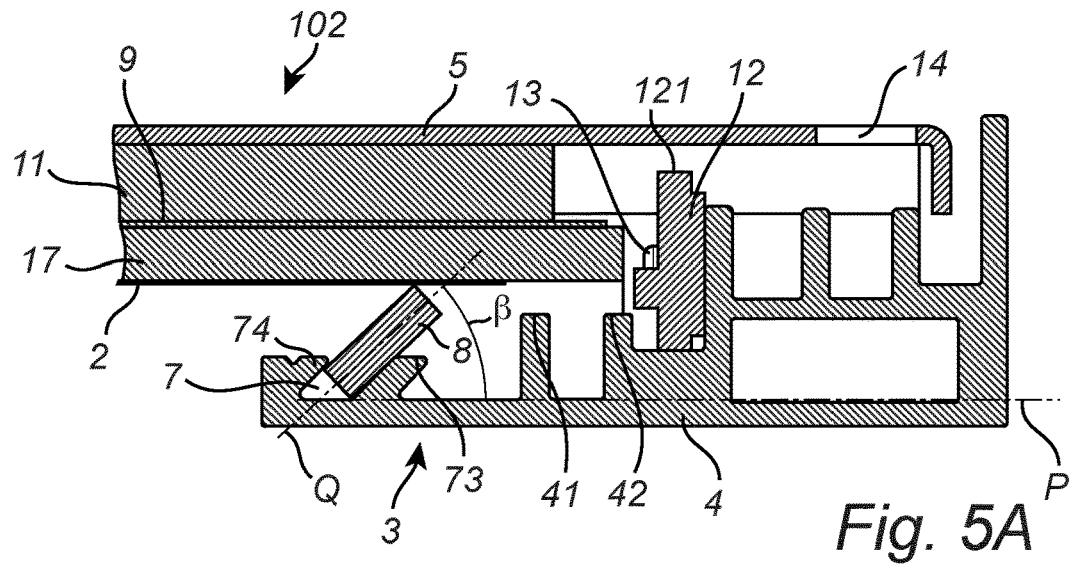
FIGS. 5A-5C shows cross sectional views of a light emitting device according to FIG. 4 in different stages of compression of the resilient element.
Figure 5B:
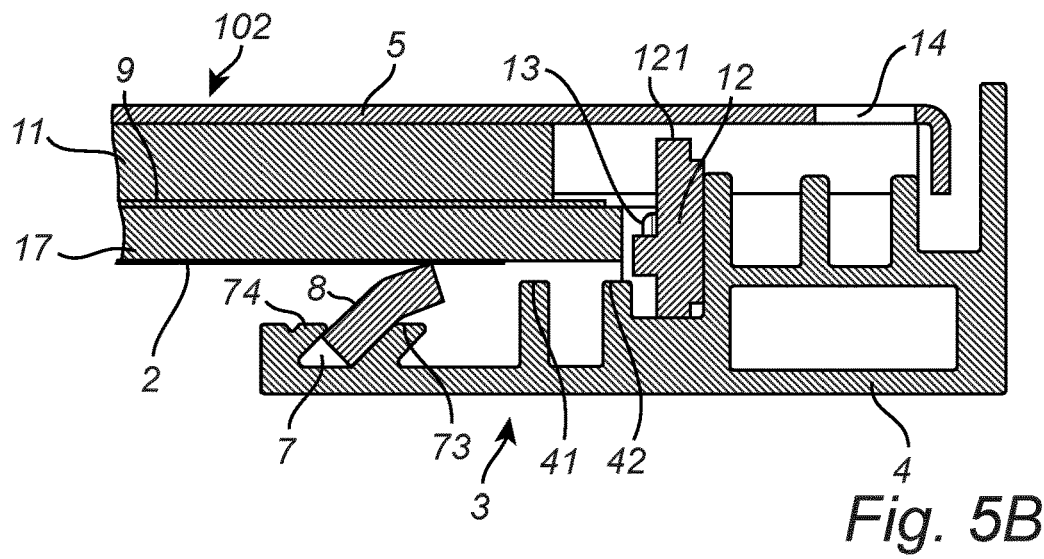
Figure 5C:
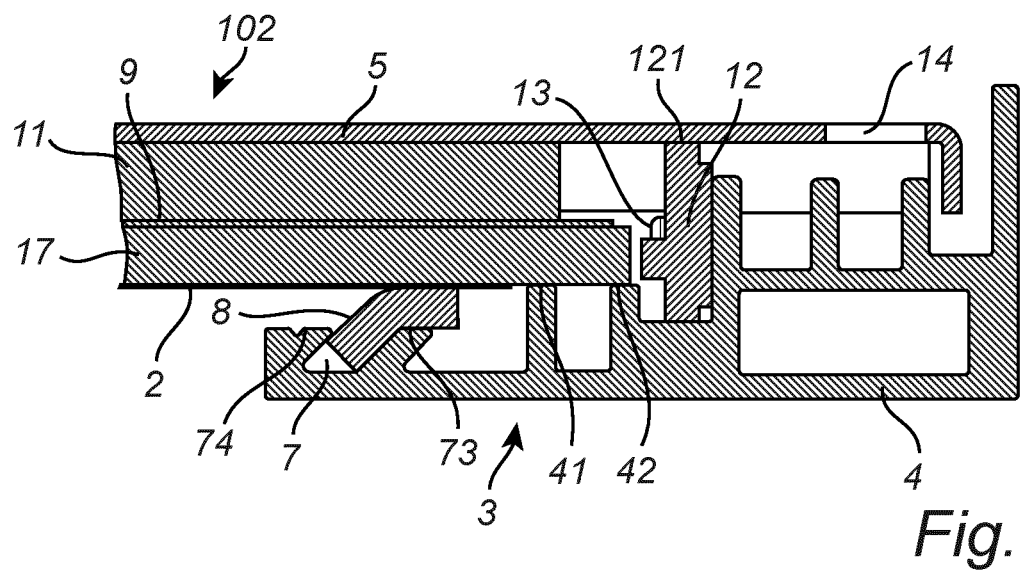

Reference is now also made to FIGS. 5A to 5C showing the light emitting device 102 according to FIG. 4 with the resilient element 8 in three different positions or degrees of flexing.

As may be seen, and as is generally applicable to all embodiments of the invention, the resilient element 8 is deformable such that it may flex between a rest position and a stress position. The rest position is shown in FIG. 5A and is defined as the position of the resilient element 8 when no tension is applied to the resilient element 8. The stress position 8 is shown in FIG. 5C and is defined as the position of the resilient element 8 when tension is applied to the resilient element 8, particularly when such an amount of tension is applied to the resilient element 8 that the resilient element 8 is caused to flex into contact with an upper surface 73 of the mounting opening 7 as shown e.g. in FIGS. 1 and 5C. FIG. 5B illustrates an intermediate position of the resilient element 8 between the rest position and the stress position.

FIGS. 5A to 5C further illustrates that when the tensioner 3 is subjected to an external transient force causing the resilient element 8 to flex from the rest position to the stress position, the back plate is brought into contact with an upper surface 121 of the substrate or PCB 12 and/or the light guide 17 is brought into contact with an upper surface 41 and/or 42 of the housing frame 4. Thereby the upper surfaces 121, 41 and/or 42 act as a stop defining the stress position of the resilient element 8. This typically occurs when the fastening element 6 reaches the bottom of the hole 16.

Figure 6:
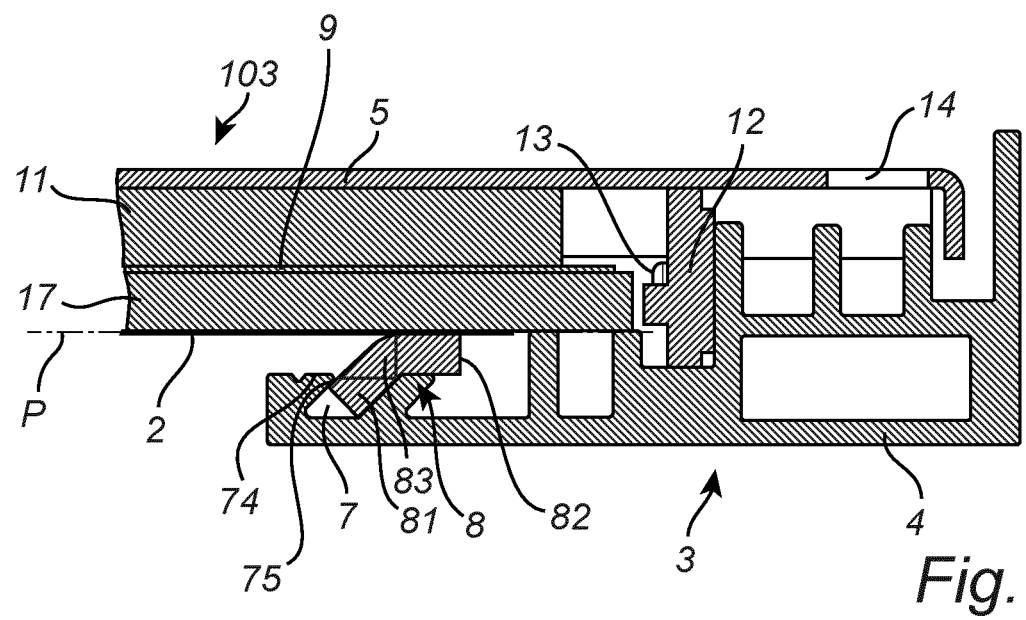
FIG. 6 shows a cross sectional view of a light emitting device according to a fifth embodiment of the invention and comprising a resilient element.

FIG. 6 shows a cross sectional view of a light emitting device 103 according to a fifth embodiment of the invention. The light emitting device 103 differs from the light emitting devices of FIGS. 1 to 4 described above only in virtue of the following features.

As shown in FIG. 6, the resilient element 8 comprises a first portion 81 which is configured to be in engagement with the mounting opening 7. The resilient element 8 further comprises a second portion 82 which is configured to be connected to or abutting the optical film 2. The resilient element 8 further comprises a third portion 83, which is provided between the first portion 81 and the second portion 82.

As shown in FIGS. 1 and 6 it may also be provided that a part of an upper surface 74 of the mounting opening 7 abuts the third portion 83, or a surface portion of the third portion 83, of the resilient element 8. This may prevent the resilient element 8 from flexing out of the mounting opening 7, i.e. prevent the first portion 81 of the resilient element 8 from coming out of engagement with the mounting opening 7, when the resilient element is in the stress position.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising an optical film and a tensioner, wherein the tensioner is configured to accommodate a change in shape and/or position of the optical film, and wherein the tensioner comprises:
   at least one resilient element, and
   a housing frame configured to be connected to a backplate of the light emitting device, the housing frame including at least one mounting opening configured to accommodate the at least one resilient element,
   the at least one resilient element being provided between the housing frame and the optical film;
   wherein the at least one resilient element is made of any one of a compressible material, a resilient material and a silicone, and is arranged to flexibly adapt and/or adjust to the different expansion and restriction conditions and position variations of the optical film
   wherein the at least one resilient element is placed in the at least one mounting opening, wherein the at least one resilient element is adapted to be in contact with the optical film, and wherein the at least one resilient element is arranged inclined with respect to a plane (P) in which the optical film extends,
   wherein the at least one resilient element is adhered to the at least one mounting opening, or wherein the at least one resilient element is attached to the at least one mounting opening by means of friction,
   wherein the at least one resilient element is deformable from a rest position to a stress position, and wherein the rest position occurs when there is no tension applied to the at least one resilient element, and wherein the stress position occurs when such an amount of tension is applied to the at least one resilient element that the resilient element is caused to flex into contact with an upper surface of the mounting opening.

2. The light emitting device according to claim 1, wherein the inclination of the at least one resilient element with respect to the plane (P) in which the optical film extends is 45 degrees or greater.

3. The light emitting device according to claim 1, wherein the at least one resilient element has a cylindrical shape, a parallelepipedal shape, or any shape being a combination of cylindrical and parallelepipedal.

4. The light emitting device according to claim 1, wherein the at least one mounting opening is configured to accommodate the at least one resilient element in a manner conforming to the inclination and shape of the at least one resilient element.

5. The light emitting device according to claim 1, further including the housing frame having a plurality of mounting openings, and the light emitting device comprises a plurality of resilient elements distributed between the optical film and the frame housing and/or at one or more edges of the optical film.

6. The light emitting device according to claim 1, and comprising an at least partially circumferential resilient element.

7. The light emitting device according to claim 1, wherein the at least one resilient element comprises a first portion which is configured to be in engagement with the at least one mounting opening, a second portion which is configured to be connected to or abutting the optical film, and a third portion, which is provided between the first portion and the second portion, and the mounting opening comprises an upper surface, at least a part of the upper surface being adapted for abutting the third portion of the resilient element.

8. The light emitting device according to claim 7,
further including the housing frame having a plurality of mounting openings, and wherein the light emitting device includes a plurality of resilient elements, each resilient element being connected to the housing frame at one of the mounting openings.

9. The light emitting device according to claim 1, wherein the at least one mounting opening comprises any one or more of:

at least one side wall being inclined with respect to a plane (P) in which the optical film extends,
an upper surface adapted for abutment with the resilient element, and
a portion adapted for abutment with a third portion of the resilient element.

10. The light emitting device according to claim 1, and further comprising any one or more of:
a substrate with at least one LED light source placed between the back plate and the housing frame, and
a reflector placed in between the optical film and the backplate.

11. The light emitting device according to claim 1, wherein the optical film is an optical element and is in contact with a light guide, wherein the light guide is arranged in an edge-lit configuration with a light source placed on an edge of the light guide, wherein the light guide is positioned in between the optical film and the backplate, and wherein a reflector is placed in between the backplate and the light guide.

12. The light emitting device according to claim 1, wherein a compressible material is placed in between the backplate and the reflector.

\* \* \* \* \*